United States Patent

Mitchell et al.

Patent Number: 5,903,278
Date of Patent: May 11, 1999

[54] PRIMITIVE COLORIZATION OF THREE DIMENSIONAL GRAPHICS TO PROVIDE FEEDBACK TO A DEVELOPER

[75] Inventors: Kathryn L. Mitchell; Michael J. Bialek, both of Corvallis, Oreg.; Keith A. Fish, Ft. Collins, Colo.

[73] Assignee: Hewlett-Packard Company, Palo Alto, Calif.

[21] Appl. No.: 08/691,974

[22] Filed: Aug. 2, 1996

[51] Int. Cl.⁶ .................................................. G06T 15/00
[52] U.S. Cl. .................... 345/431; 345/418; 395/183.01; 395/183.14
[58] Field of Search ..................................... 345/418–419, 345/431; 395/183.01, 183.03, 183.08–183.09, 183.13–183.15, 183.18–183.2

[56] References Cited

U.S. PATENT DOCUMENTS

| | | | |
|---|---|---|---|
| 5,682,489 | 10/1997 | Harrow et al. | 395/349 |
| 5,684,945 | 11/1997 | Chen et al. | 395/182.18 |
| 5,687,376 | 11/1997 | Celi et al. | 395/704 |
| 5,720,018 | 2/1998 | Muller et al. | 345/433 |
| 5,729,726 | 3/1998 | Levine et al. | 395/580 |
| 5,751,945 | 5/1998 | Levine et al. | 396/184.01 |

OTHER PUBLICATIONS

Dunwoody JC et al.: "Tracing Interactive 3D Graphics Programs", 1990 Symposium On Interactive 3D Graphics, Mar. 25–28, 1990, pp. 155–163.

"Improving Performance Of Visual Trace Analysis Using Abstract Time–Lines" IBM Technical Disclosure Bulletin, vol. 38, No. 3; Mar. 1, 1995; pp. 281–284.

"Multiple types of Graphical Context on a Graphics Adapter", IBM Technical Disclosure Bulletin, vol. 34, No. 7B. Dec. 1991, pp. 29–30.

*Primary Examiner*—Rudolph J. Buchel, Jr.

[57] ABSTRACT

Encoded information is provided about how an image is rendered. When the image is initially rendered, preselected colors are used. The image is re-rendered so that colors used to re-render the image encode information about how the image was originally rendered. For example, the colors for the re-rendered image indicate for each part of the image, the number of vertices included in that part of the image. Alternatively, the colors for the re-rendered image indicate for each part of the image, which type of primitive within a graphics library is used to re-render the first part of the image, or the colors for the re-rendered image indicate for each part of the image, scheduling path within the graphics library used to render that part of the image.

40 Claims, 14 Drawing Sheets

PRIMITIVE COLORIZATION OF THREE DIMENSIONAL GRAPHICS TO PROVIDE FEEDBACK TO A DEVELOPER

BACKGROUND

The present invention concerns software tools for analyzing operations of application programs and pertains particularly to the colorization of primitives within computer generated three dimensional (3D) graphics being re-rendered to a computer display in order to provide feedback to a user of the software tool.

Utilizing a 3D graphics library to develop a high performance 3D graphics application can be an extremely complex task. In order to achieve optimal performance of the graphics application, it is often required that a developer have an intimate knowledge of the graphics library which underlies the graphics application and into which the graphics application makes calls. Various tools have been developed in order to help developers effectively utilize graphics libraries.

For example, Silicon Graphics Inc., has made available a number of graphics performance analysis tools. These include, for example, the glprof analysis tool, the gldebug analysis tool, the ogldebug analysis tool, and Iris Performer tools. Using the glprof analysis tool it is possible to capture the IRIS GL application programming interface (API) calls used to generate a single image into a trace. IRIS GL graphics library is a 3D graphics library available from Silicon Graphics, Inc. The generated traces are stored in trace files. The traces may be replayed to re-render the graphics image. Also, different graphics configurations can be simulated to predict the utilization of the different stages of the graphics pipeline when re-playing the trace for these different configurations. Additionally, a limited set of rendering options can be overridden from the glprof analysis tool so that calls made in a captured trace can be ignored. The captured traces can also be replayed and timed to determine the maximum performance possible for the trace.

The gldebug analysis tool monitors IRIS GL API calls made by a graphics application. From these monitored calls, visual and textual representations of the current graphics state is shown. Also, using the gldebug analysis tool, API calls made by the graphics application can be saved in a C formatted file. Additionally, breakpoints can be set on API calls. If an appropriate debugger is active, the application source code will be shown for the breakpoint. Further, the gldebug analysis tool allows a user to select API calls to skip.

The ogldebug analysis tool operates similar to the gldebug analysis tool, but is used for the OpenGL API. OpenGL graphics library is a 3D graphics library product available from Silicon Graphics, Inc. Using the ogldebug analysis tool, API calls made by the graphics application are monitored. Textual representation of the current graphics state can be shown. Additionally, performance hints can be generated and information about graphics display lists can be generated.

For Iris Performer tools, also available from Silicon Graphics, Inc., instrumentation is built into the Iris Performer toolkit. This allows for the generation of numerous graphs and statistics. When using the Iris Performer tools, information is displayed in real time. No trace files are generated. Additionally, a user can change the color of specific primitives to highlight the screen size and locations of these primitives in the rendered image. In general, a primitive is a call into a graphics library which results in a particular shape being drawn on a display.

SUMMARY OF THE INVENTION

In accordance with the preferred embodiment of the present invention, encoded information is provided about how an image is rendered. The image is rendered, for example, by a graphics application. When the image is rendered, preselected colors are used. These colors are, for example, preselected by a developer/user of the image. The image is re-rendered, for example, using an analyzer tool, so that colors used to re-render the image encode information about how the image was originally rendered. For example, the colors for the re-rendered image indicate for each part of the image, the number of vertices included in that part of the image. Alternatively, the colors for the re-rendered image indicate for each part of the image, which type of primitive within a graphics library was used to originally render that part of the image, or the colors for the re-rendered image indicate for each part of the image, scheduling path within the graphics library used to originally render that part of the image.

The colors for the re-rendered image also can indicate other information about how the image was originally rendered. For example, a first color used to render a first part of the image can indicate an elapse of time within the graphics application making primitive calls. The elapsed time begins when a previously called primitive returns control to the graphics application and ends when the graphics application called a first primitive within the graphics library which renders the first part of the image. Alternatively, a first color used to render a first part of the image can indicate the number of pixels used to display the first part of the image. Further, a first color used to render a first part of the image can indicate a number of facets of the first part of the image. Also, a first color used to render a first part of the image can indicate whether an attribute was set redundantly before the first part of the image was rendered. A first color used to render a first part of the image can also indicate an amount of time for a primitive within the graphics library to render the first part of the image.

The present invention allows for effective and accurate feedback to a user/developer of information about how a graphics application utilizes primitives within a graphics library to render an image and how efficiently these primitives are rendered by the graphics pipeline in the graphics library.

BRIEF DESCRIPTION OF THE DRAWINGS

The file of this patent contains at least one drawing executed in color. Copies of this patent with color drawings (s) will be provided by the Patent and Trademark Office upon request and payment of the necessary fee.

DESCRIPTION OF THE PREFERRED EMBODIMENT

Figure 1:
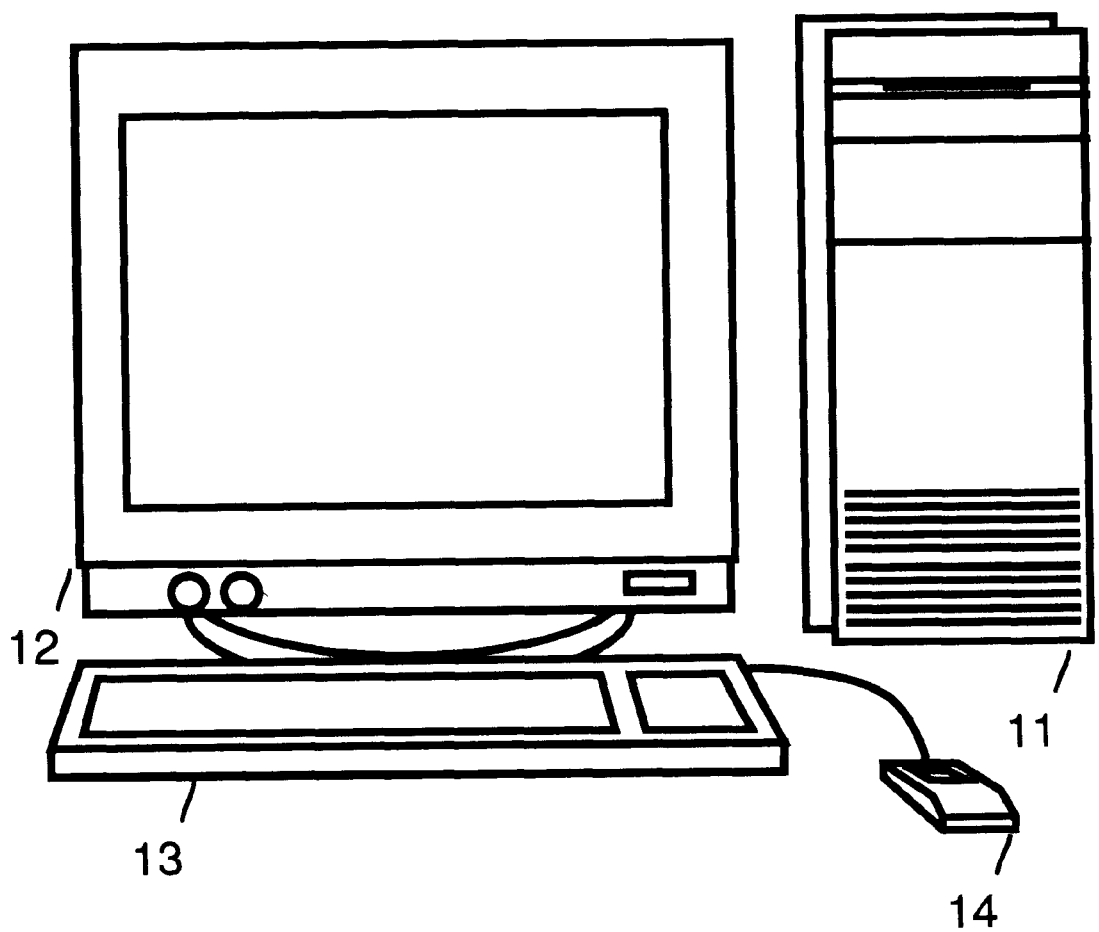
FIG. 1 is a block diagram of a computer system.

FIG. 1 shows a computing system which acts as a graphics work station. The computing system includes a housing 11 for various processing units within the computing system, a monitor 12, a keyboard 13 and a pointing device 14.

Figure 2:
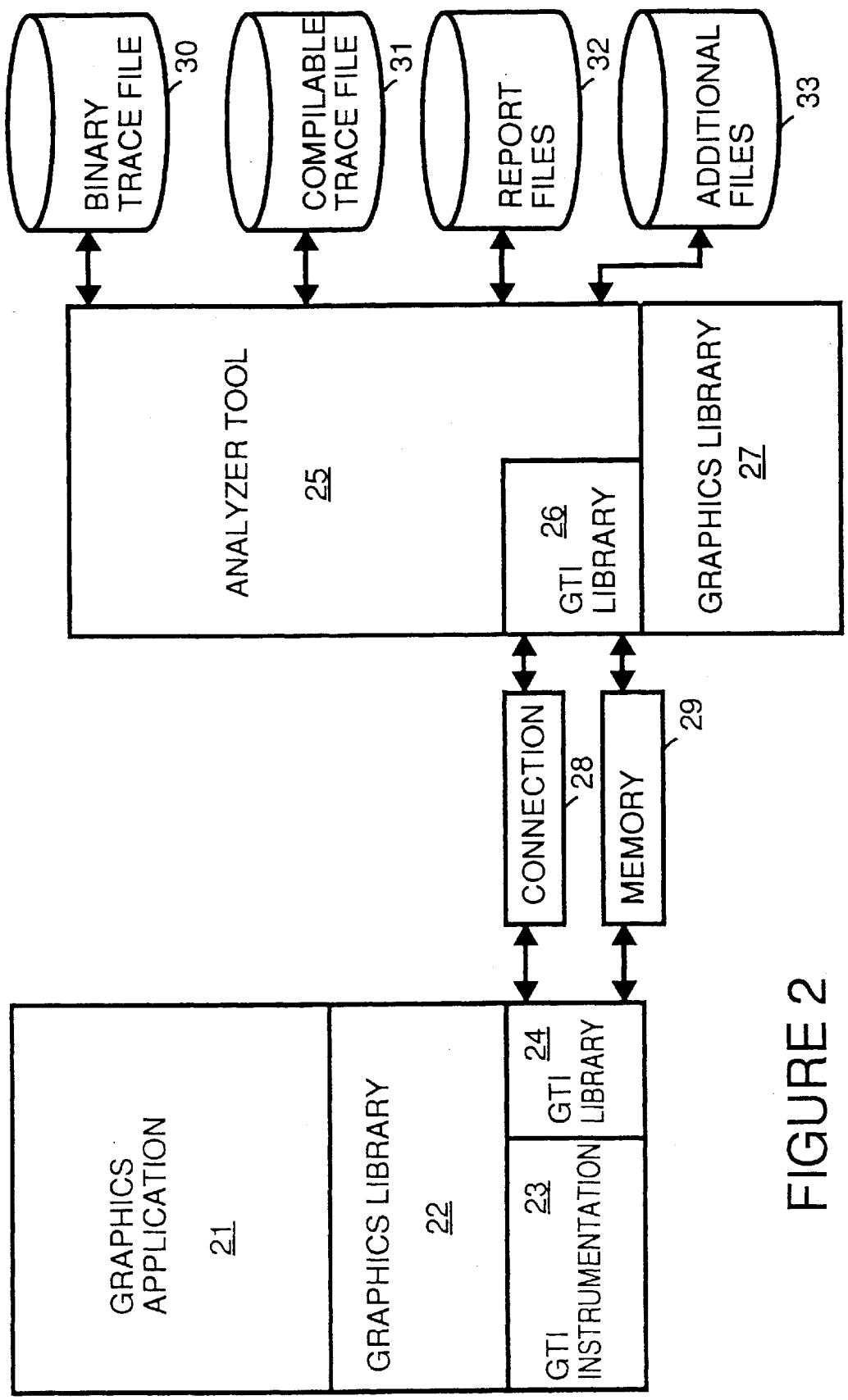
FIG. 2 is a block diagram which illustrates interaction between a graphics application and an analyzer tool in accordance with a preferred embodiment of the present invention.

FIG. 2 is a block diagram which illustrates interaction between a graphics application 21 and an analyzer tool 25 within the computer system shown in FIG. 1. Graphics application 21 is, for example, an HP Model Viewer graphics application available from Hewlett-Packard Company, or some other graphics application such as a program to do mechanical part design or architectural engineering.

Graphics application 21 makes calls to a graphics library 22. For example, graphics library is a Starbase graphics library available from Hewlett-Packard Company, having a business address of 3000 Hanover Street, Palo Alto, Calif. 94304, or an OpenGL graphics library available from Silicon Graphics, Inc. Into graphics library 22 is added graphics tool interface (GTI) instrumentation 23. GTI instrumentation 23 is code which is added to graphics library 22 to capture information regarding the execution of code within graphics library 22. GTI instrumentation 23 writes data events to analyzer tool 25, as further described below. GTI instrumentation 23 also reads control events generated by analyzer tool 25. The control events specify what data events should be sent to analyzer tool 25. The control events indicate this by specifying what portions of GTI instrumentation 23 should be enabled, when the portions of GTI instrumentation 23 should be enabled and for how long the portions of GTI instrumentation should be enabled.

A GTI library 24 and a GTI library 26 contain functions which are accessed by graphics library 22 and analyzer tool 25 to establish the connection between analyzer tool 25 and graphics library 22. GTI library 24 and GTI library 26 also contain functions to read and write GTI events.

Communication between graphics library 22, through GTI library 24, and analyzer tool 25, through GTI library 26, is done via a connection 28 and shared memory 29. For example, connection 28 is a standard UNIX (TCP/IP) socket connection. Alternatively, some other type of connection may be used.

Shared memory 29 is, for example, a standard UNIX shared memory block which is used to establish connection between graphics library 22 and analyzer tool 25. Graphics application 21 registers itself in shared memory so that analyzer tool 25 knows with which process corresponding to graphics application 21/graphics library 22 analyzer tool 25 can establish connection. Similarly, analyzer tool 25 registers itself in shared memory so graphics application 21/graphics library 22 knows which socket will be used for communication with analyzer tool 25.

Analyzer tool 25 provides to a developer (user) the ability to determine how graphics application 21 is utilizing graphics library 22. Analyzer tool 25, as further described below, allows for real time monitoring of graphics performance as well as post processing of collected traces. All communication between graphics library 22 and analyzer tool 25 is done via GTI library 24 and GTI library 26, as described above.

Analyzer tool 25 uses a binary trace file 30 to store in binary form traces (consisting of data events received from graphics library 22). After traces have been captured in binary trace file 30, the traces can be written out to a compilable trace file 31 to be viewed or compiled by a user at a later time.

Analyzer tool 25 writes to compilable trace file 31 by converting API events (a type of data event described below) into C programming language statements which can be compiled. For example, when analyzer tool 25 captures and converts into compilable trace file 31 API events for all graphics API calls made from graphics application 21 to graphics library 22 used to construct an image, then the resulting C programming language statements written in compilable trace file 31 can be compiled and executed to generate the same image constructed by graphics application 21.

Analyzer tool 25 additionally uses other files. For example report files 32 are used to store text files which provide various report information to a user. Additional files 33, for example, include help files, resource files and configuration files utilized by analyzer tool 25.

Figure 3:
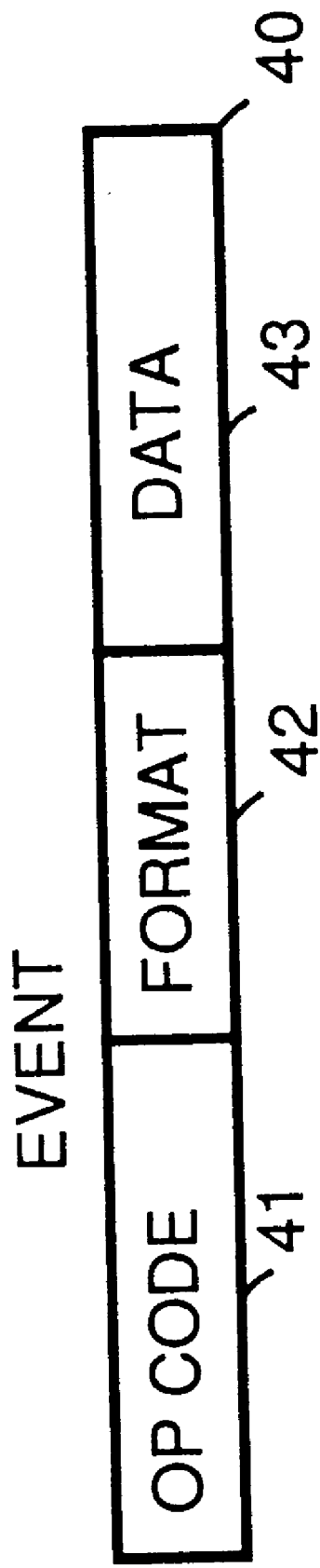
FIG. 3 shows structure of an event in accordance with a preferred embodiment of the present invention.

FIG. 3 shows the typical structure for a GTI event 40. Each GTI event 40 (whether a data event or a control event) has an operation (op) code 41. Op code 41 is an integer value that allows analyzer tool 25 and graphics library 22 to recognize and use the GTI event.

Additionally, each GTI event 40 also has a format string 42. Format string 42 is used to encode the parameters (if present) that are being passed with event 40. Different characters within format string 42 are used to represent the fundamental data types of the parameters. Special encodings are used for complex data structures and arrays. For example, Table 1 below gives examples of characters for format strings and their associated data types.

TABLE 1

| Format String | Data Type |
| --- | --- |
| ii | GTI event has two 32 bit integer parameters |
| ff | GTI event has two 32 bit floating point values |
| v | GTI event has one parameter of void type, two values are passed with void types, the size of the void type and the contents of the void type. Void types are used to send data structures that have more than one element. |
| *I | GTI event has an array of unsigned 16 bit integers. Two sets of values are passed with this event. The first is the number of elements in the array. The second are the array elements. |

A GTI event may have no parameters associated with it. In this case format string 42 will be an empty string and no data will be passed with the GTI event.

As discussed above, data events are written from graphics library 22 (shown in FIG. 3) back to analyzer tool 25. Data events are, for example API events, timing events or monitor events.

An API event indicates an API call, including data from API parameters, which is sent from graphics application 21 to a graphics routine within graphics library 22. In order to forward API events to analyzer tool 25, instrumentation is added to the beginning of a graphics routine. The instrumentation, when enabled, will forward an identifier of the API call, including the parameters, to analyzer tool 25 when the graphics application 21 makes an API call to the graphics routine within graphics library 22.

Timing events contain information which allows analyzer tool 25 to determine how much time was spent in a graphics routine within graphics library 22, and how much time was spent in graphics application 21 between API calls to graphics library 22.

Monitor events, when enabled, are events sent when only minimal instrumentation is enabled within graphics library 22. Monitor events provide accurate performance measurement information with the generation of monitor events producing only a nominal performance penalty of the graphics library routines. For example, a frame rate event is a monitor event which, when enabled, is written only once per graphics application generation of a frame (image) for display on monitor 12. The frame rate event allows analyzer tool 25 to determine the frame rate (images drawn per unit time) that is being achieved by graphics application 21.

Control events are generated by analyzer tool 25 and sent to graphics library 22. There are two types of control events: event selection events and trigger events.

Event selection events enable GTI instrumentation in graphics library 22. Analyzer tool 25 can enable instrumentation based on the op codes of the data events the analyzer tool wishes to receive from graphics library 22. For example, if analyzer tool 25 desires to receive a data event from graphics library 22 for every graphics API call made by graphics application 21 to graphics library 22, analyzer tool 25 enables op codes for every data event which represents a graphics API call from graphics application 21 to graphics library 22. The resulting trace can be stored (as described above) and used by analyzer tool 25 to generate (i.e., render) the image (as illustrated below).

Trigger events control when and for how long graphics library 22 will generate data events. In the preferred embodiment of the present invention, there are three types of trigger events: manual trigger events, time trigger events and frame trigger events.

A manual trigger event tells graphics library 22 to start generating data events as soon as the manual trigger event is received. A second manual trigger event will be sent by analyzer tool 25 to tell graphics library 22 when to stop generating the data events.

A time trigger event tells graphics library 22 to start generating data events as soon as the time trigger event is received. The time trigger event contains one parameter that indicates for how long graphics library 22 should generate data events.

A frame trigger event has two parts. The first part is the frame definition. The second part of the frame trigger event is the frame trigger itself. A frame trigger definition consists of a starting API call and an ending API call. The op codes used for the API calls are used to specify the starting and ending calls. A frame trigger event has two parameters. The first parameter indicates the number of frames to skip before data events are generated. The second parameter indicates the number of frames for which to generate data events.

Table 2 below gives a pseudo code example of instrumentation (i.e., a portion of GTI instrumentation 23) added to a graphics routine (GraphicsRoutine) within graphics library 22.

TABLE 2

GraphicsRoutine (Parameters . . . )
Begin Routine
/* Instrumentation placed at the beginning of the routine follows*/
  if INSTRUMENTATION ENABLED
    read time
    if API INSTRUMENTATION ENABLED
      write GTI API event for GraphicsRoutine  /* this line of code, when enabled, sends an API event to analyzer tool 25 */
    read time
/* The graphics function is performed here */
  Perform non-instrumentation work
/* Instrumentation placed at the end of the routine follows*/

Figure 4:
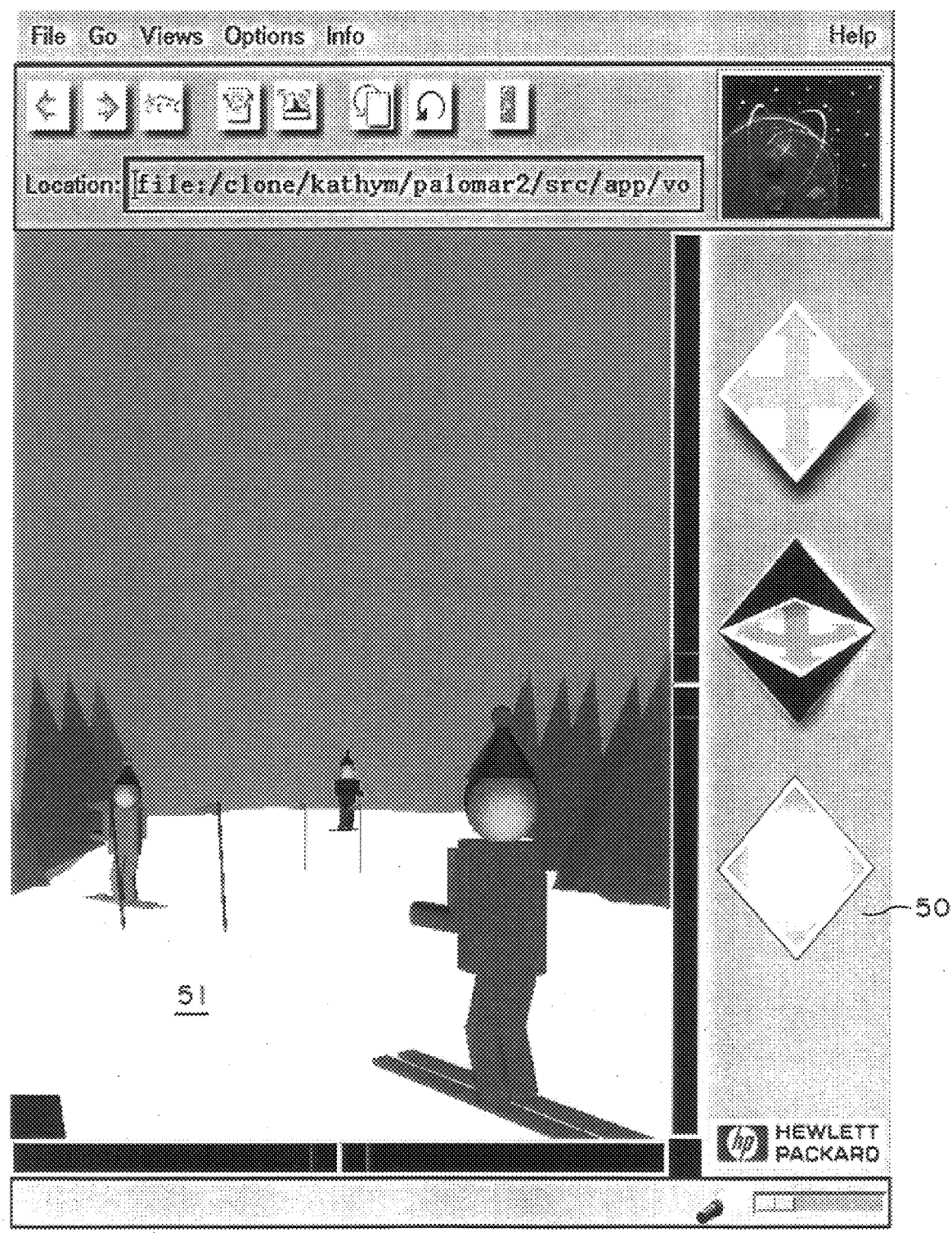
FIG. 4 shows a display of a graphics application.

TABLE 2-continued if INSTRUMENTATION ENABLED
    read time
    if TIMING INSTRUMENTATION ENABLED
      write GTI TIMING event for GraphicsRoutine  /* this line of code, when enabled, sends a timing event to analyzer tool 25 */
    read time
End Routine FIG. 4 shows a display window 50 generated by graphics application 21 and shown on monitor 12. Display window 50 is generated, for example by an HP Model Viewer graphics application available from Hewlett-Packard Company. Graphics application 21 uses graphics library 22 to generate a three-dimensional image 51 within display window 50.

Figure 5:
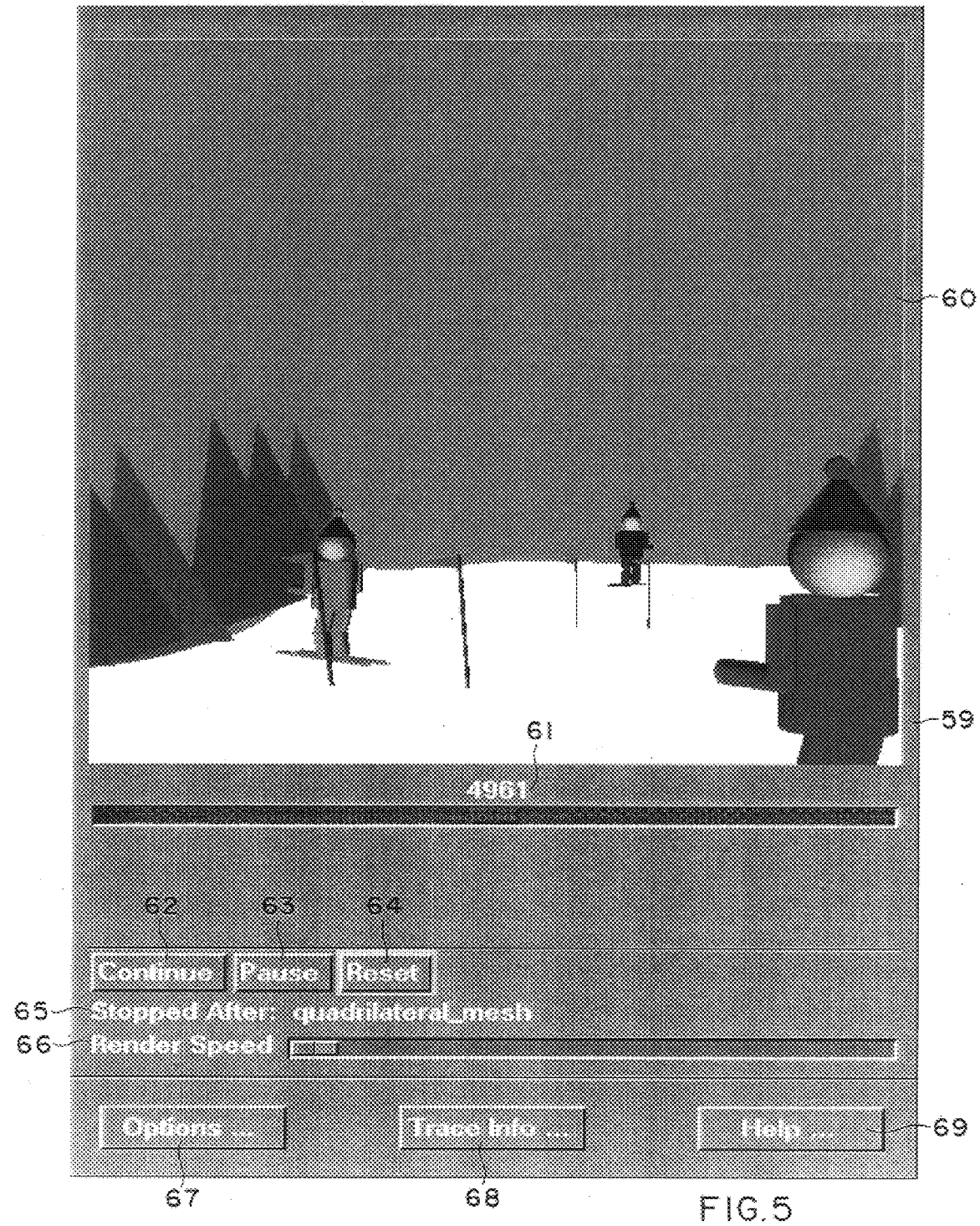
FIGS. 5, 6, 7, 8, 9, 10, 11, 12 and 13 show displays of an analyzer tool to illustrate the colorizing functionality of the present invention.

FIG. 5 shows a display window 59 generated by analyzer tool 25 and shown on monitor 12. In order to generate a three-dimensional image 60 within display window 59, analyzer tool 25 uses API events generated by GTI instrumentation 23 within graphics library 22, as described above, to capture API calls made from graphics application 21 to graphics library 22. A trace of the API calls (based on the captured API events) is stored in binary trace file 30. These are played back to generate image 60.

As shown in FIG. 5, analyzer tool 25 generates three-dimensional image 60 using the same colors used for the display of three-dimensional image 51 generated by graphics application 21. While display 50 and display 59 are shown in separate Figures, both display 50 and display 59 can be displayed simultaneously on monitor 12.

As described above, in order to generate image 60, analyzer tool 25 executes sequentially a trace of API events sent from graphics library 22. A current API event indicator 61 indicates a last API event that was used by analyzer tool 25 to generate image 60. Since the API events are numbered consecutively, current API event indicator 61 indicates that 4961 API events (representing 4961 API calls from graphics application 21 to graphics library 22) were performed to generate image 60.

A user may select a continue button 62 to continue execution of the trace when execution of a trace by analyzer tool 25 has been paused, has stopped on a breakpoint or has been reset.

A user may select a pause button 63 in order to cause analyzer tool 25 to stop executing (rendering) an image. Resumption of the execution/rendering of the image continues upon a user selecting continue button 62.

A user may select a reset button 64 in order to clear image 60 and point to a first API event in the event stream trace.

A display line 65 indicates an API call on which analyzer tool 25 stopped executing or rendering image 60. This indicates the API call on which a breakpoint was set.

A display line 66 sets a rendering speed at which image 60 is rendered.

Figure 9:
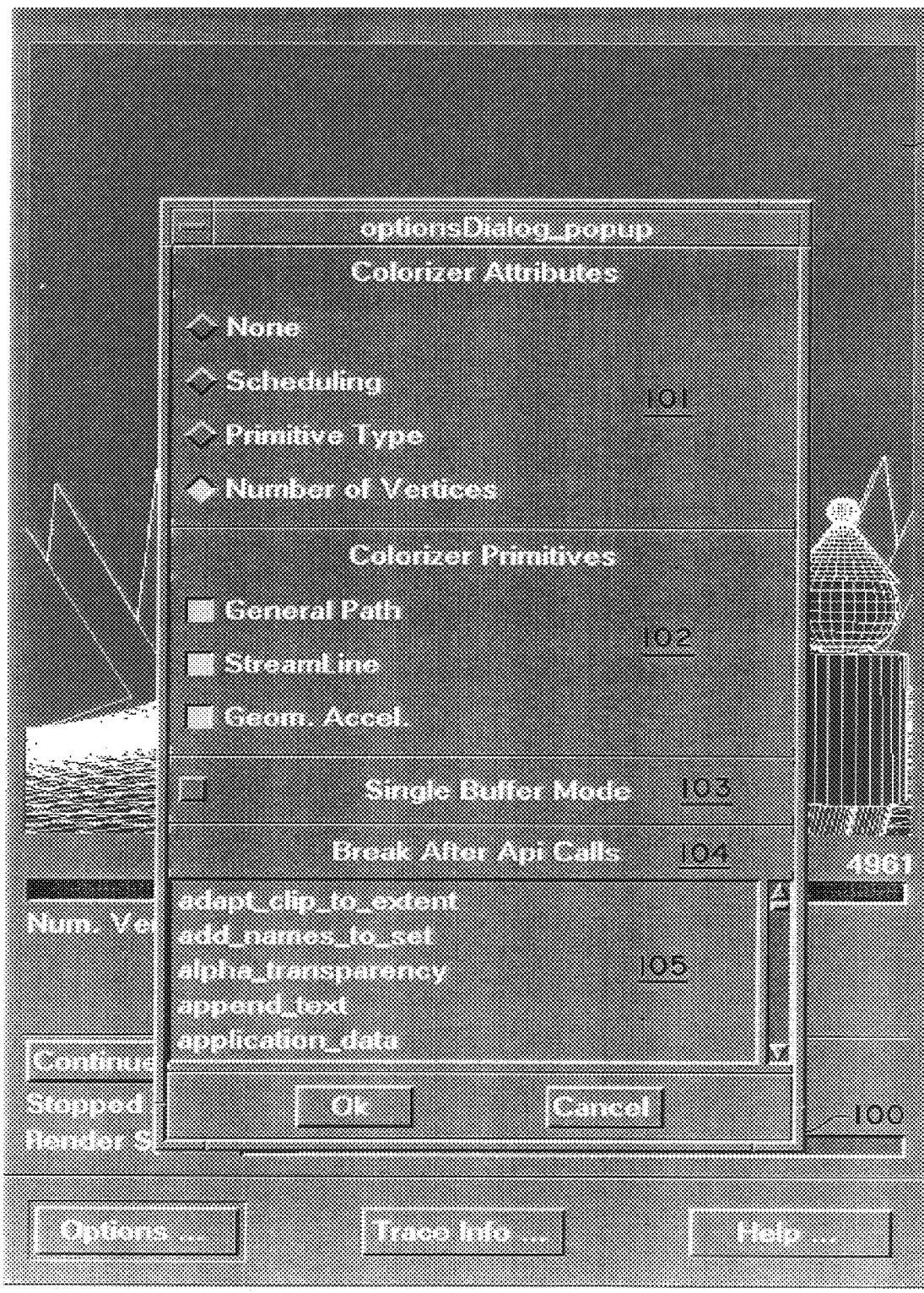

A user may select an options button to bring up an option dialog box 100 shown in FIG. 9. A user may select a trace information button 68 in order to bring up a trace information dialog box shown in FIG. 13. A user may select a help button 69 in order to receive information on using analyzer tool 25.

Using option dialog box 100 shown in FIG. 9, a user can select information to be color coded within rendered image 60.

Figure 6:
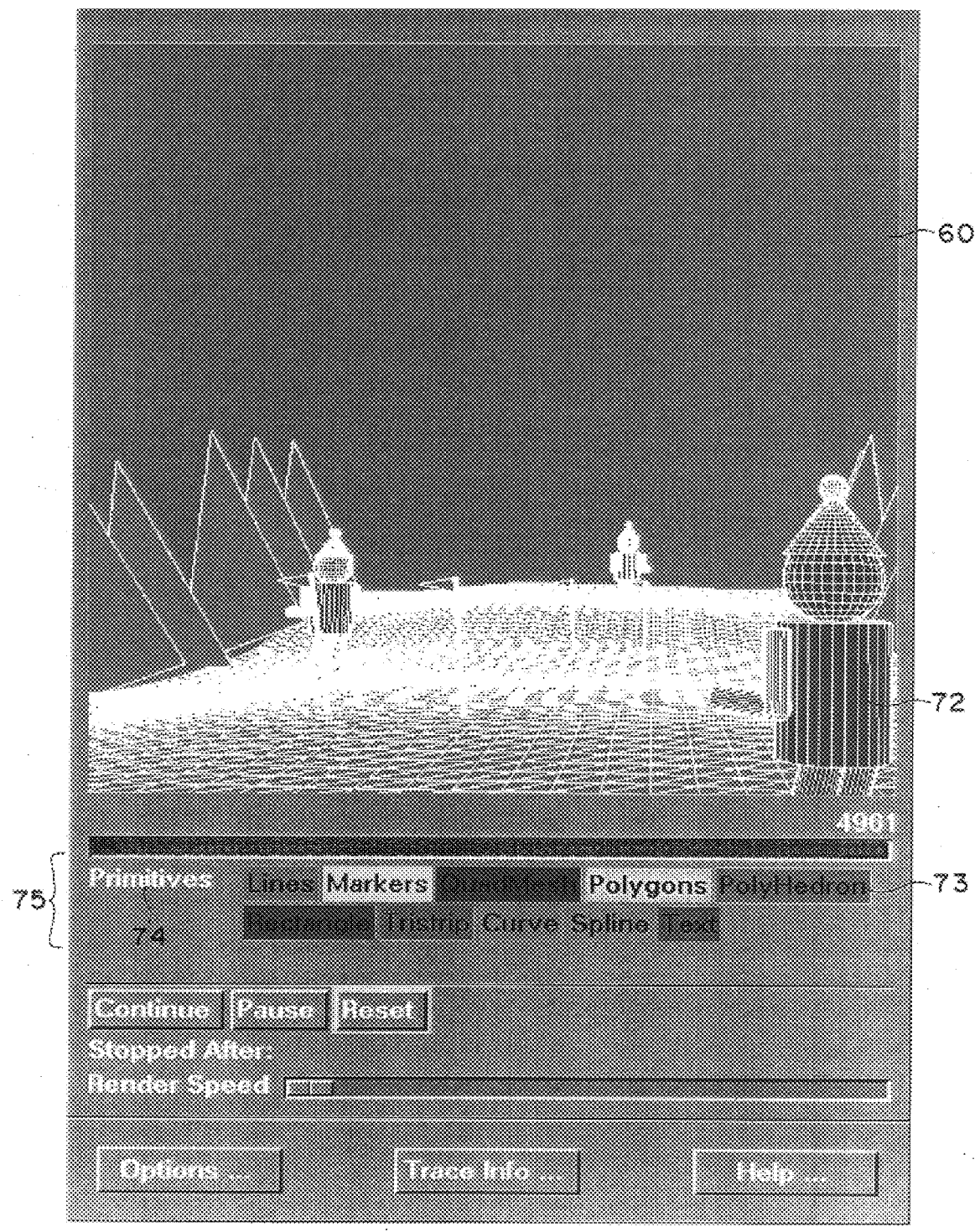

For example, FIG. 6 shows image 60 re-rendered so that colors shown indicate the primitives used to render each portion of image 60. A type indicator 74 of a legend 75 indicates which information is color-coded in re-rendered image 60. Category indicator 73 of legend 75 indicates which colors indicate which type of primitives. Primitives are the basic visual building blocks which are used by graphics application 21 to generate an image. Analyzer tool 25 is able to determine which types of primitives are used to generate each portion of re-rendered image 60 by information from API events which analyzer tool 25 receives from graphics library 22. The primitive categories shown by legend 75 are "Lines", "Markers", "QuadMesh", "Polygons", "PolyHedron", "Rectangle", "Tristrip", "Curve", "Spline" and "Text". As can be seen from FIG. 6, analyzer tool 25 indicates trees 71 within image 60 are constructed using the PolyHedron primitive, as indicated by the pink color of trees 71. Likewise, as can be seen from FIG. 6, analyzer tool 25 indicates skier 72 within image 60 is constructed using the QuadMesh primitive, as indicated by the blue color of skier 72.

Figure 7:
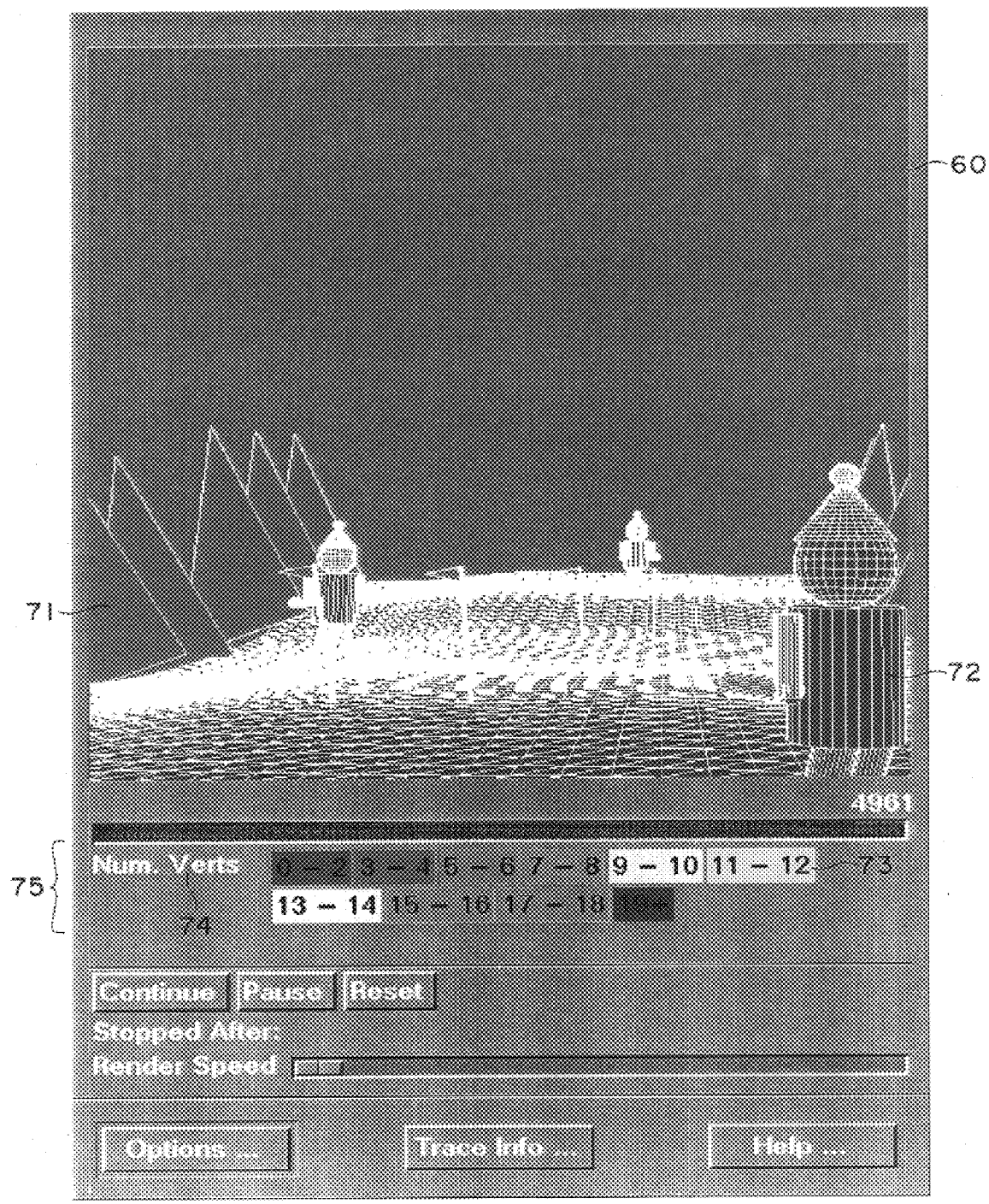

FIG. 7 shows image 60 re-rendered so that colors shown indicate the number of vertices used to render each portion of image 60. Type indicator 74 of legend 75 indicates the number of vertices is color-coded in re-rendered image 60. Category indicator 73 of legend 75 indicates which colors indicate which number of vertices. Analyzer tool 25 is able to determine how many vertices are used to generate each portion of re-rendered image 60 by information from API events which analyzer tool 25 receives from graphics library 22. The vertex categories shown by legend 75 are "0–2", "3–4", "5–6", "9–10", "11–12", "13–14", "15–16", "17–18" and "19+". As can be seen from FIG. 7, analyzer tool 25 indicates trees 71 within image 60 are constructed using 3–4 vertices, as indicated by the orange-red color of trees 71. Likewise, as can be seen from FIG. 7, analyzer tool 25 indicates skier 72 within image 60 is constructed using 19+ vertices, as indicated by the green color of skier 72.

Figure 8:
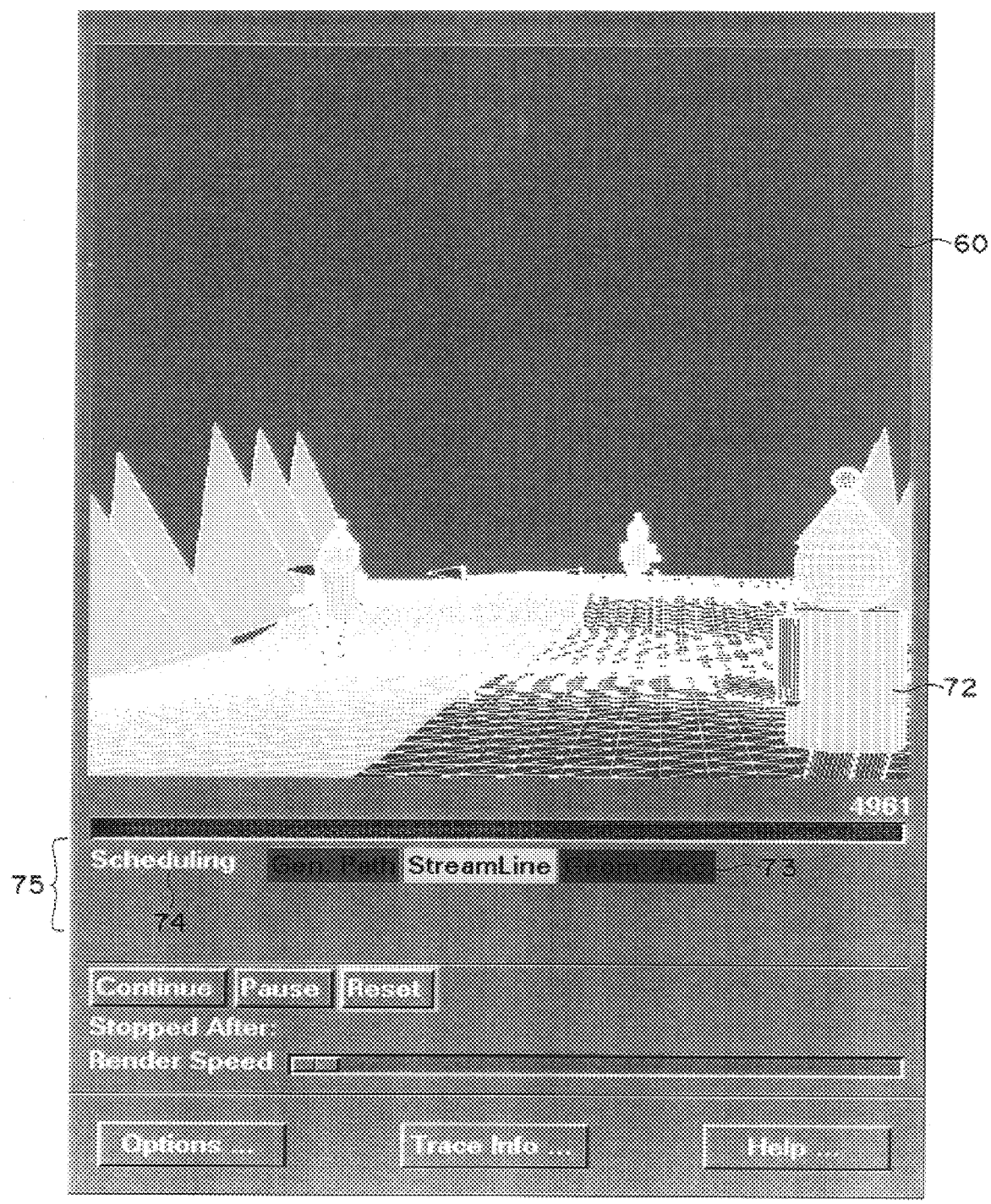

FIG. 8 shows image 60 re-rendered so that colors shown indicate the scheduling path within graphics library 22 used to render each portion of image 60. Type indicator 74 of legend 75 indicates that the parts of re-rendered image 60 are color-coded based on the path on which each primitive API call for each part was scheduled for the graphics pipeline within graphics library 22. Category indicator 73 of legend 75 indicates which colors indicate which scheduling path was used. The path on which a primitive is scheduled is an indication of how efficiently the graphics pipeline is being utilized. Analyzer tool 25 is able to determine which scheduled path is used to generate each portion of re-rendered image 60 by information from API events which analyzer tool 25 receives from graphics library 22. Analyzer tool 25 monitors use of three different scheduling paths. The scheduling categories shown by legend 75 are "general path", "streamline path", and "geometry accelerated path". As can be seen from FIG. 7, analyzer tool 25 indicates trees 71 within image 60 are constructed using a streamline path, as indicated by the yellow color of trees 71. Likewise, as can be seen from FIG. 7, analyzer tool 25 indicates skier 72 within image 60 is also constructed using the streamline path, as indicated by the yellow color of skier 72.

Figure 14:
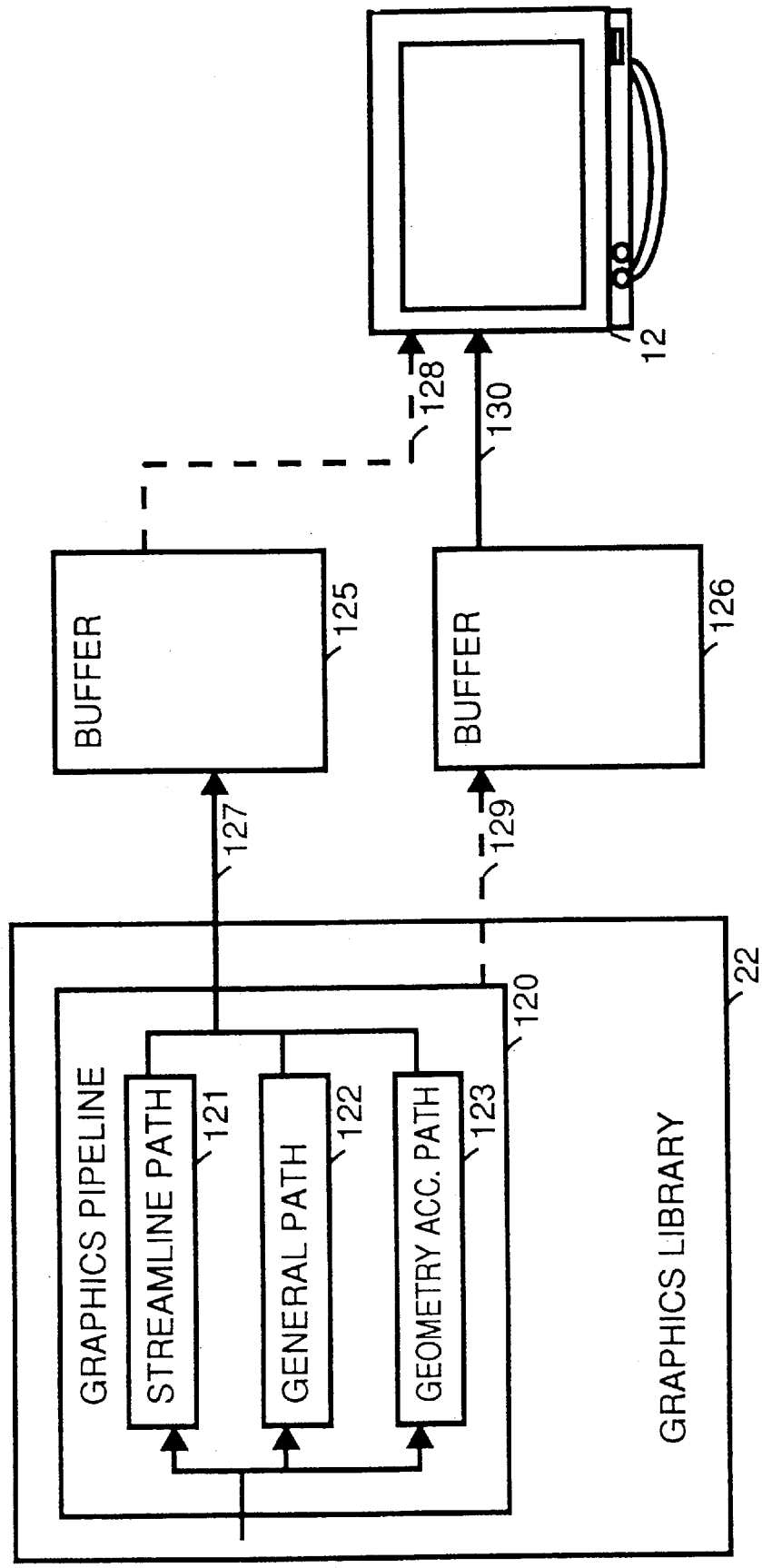
FIG. 14 is a simplified block diagram which illustrates operation of a graphics library.

FIG. 14 is a simplified block diagram which shows a graphics pipeline 120 within graphics library 22. Within graphics pipeline 121 there is a stream-line path 121, a general path 122 and a geometry accelerated path 123. FIG. 9 shows details of option dialog box 100. In a color attributes section 101, a user can select what colors of image 60 indicate. If "None" is selected, analyzer tool 25 generates three-dimensional image 60 using the same colors used for the display of original three-dimensional image 51 generated by graphics application 21, as shown in FIG. 5. If "Scheduling" is selected, analyzer tool 25 generates three-dimensional image 60 so that colors shown indicate the scheduling path used to render each portion of image 60, as shown in FIG. 8. If "Primitive Type" is selected, analyzer tool 25 generates three-dimensional image 60 so that colors shown indicate the primitive type used to render each portion of image 60, as shown in FIG. 6. If "Number of Vertices" is selected, analyzer tool 25 generates three-dimensional image 60 so that colors shown indicate the number of vertices used to render each portion of image 60, as shown in FIG. 7.

Once a color attribute is selected, analyzer tool 25, when rendering each portion of image 60, colors the portion appropriately to reflect the appropriate attribute. For example, when the selected color attribute is "scheduling", analyzer tool 25 uses logic similar to the pseudo code set out in Table 3 below to color each portion of image 60.

TABLE 3

.
.
.

If portion is generated using a general path
    Color the portion red;
If portion is generated using a streamline path
    Color the portion yellow;
If portion is generated using a geometry accelerated path
    Color the portion green;

.
.
.

In a colorizer primitives section 102 of option dialog box 100, a user can indicate on which scheduling paths API calls used to generate image 51 will be used by analyzer tool 25 to render image 60. For the re-rendering of image shown in FIGS. 5, 6, 7 and 8, all scheduling paths are used. For the re-rendering of image 60 shown in FIG. 10, only primitives rendered by the geometry accelerated path through the graphics pipelines are rendered by analyzer tool 25 to generate image 60.

In a buffer mode section 103, a selection can be made whether a single buffer or a double buffer is used to construct the image. When double buffer mode is used, one buffer is displayed while the other is being filled. In single buffer mode, only a single buffer is used so that a user can observe an image being built up one primitive at a time.

For example, in FIG. 14, graphics application is shown able to use both a buffer 125 and a buffer 126 in order to generate an image. When in double buffer mode, while graphics application 21 is placing information into buffer 125 using a data path 127, the information in buffer 126, sent along data path 130, is used to generate the image shown on monitor 12. Likewise while graphics application 21 is placing information into buffer 126, using a data path 129, the information in buffer 125, sent along data path 128, is used to generate the image shown on monitor 12.

When in single buffer mode only one of the buffers used. Thus, in single buffer mode, while graphics application 21 is placing information into buffer 125 using a data path 127, the information in buffer 125, sent along data-path 128, is also used to generate the image shown on monitor 12.

In a break selection segment 104 of option dialog box 100 (shown in FIG. 9), a user can select an API call from box 105 as a breakpoint on which to halt execution/rendering of the image. A breakpoint can be set on any API call. To resume checking the user selects the continue button. This is illustrated, for example, by FIG. 11.

Figure 10:
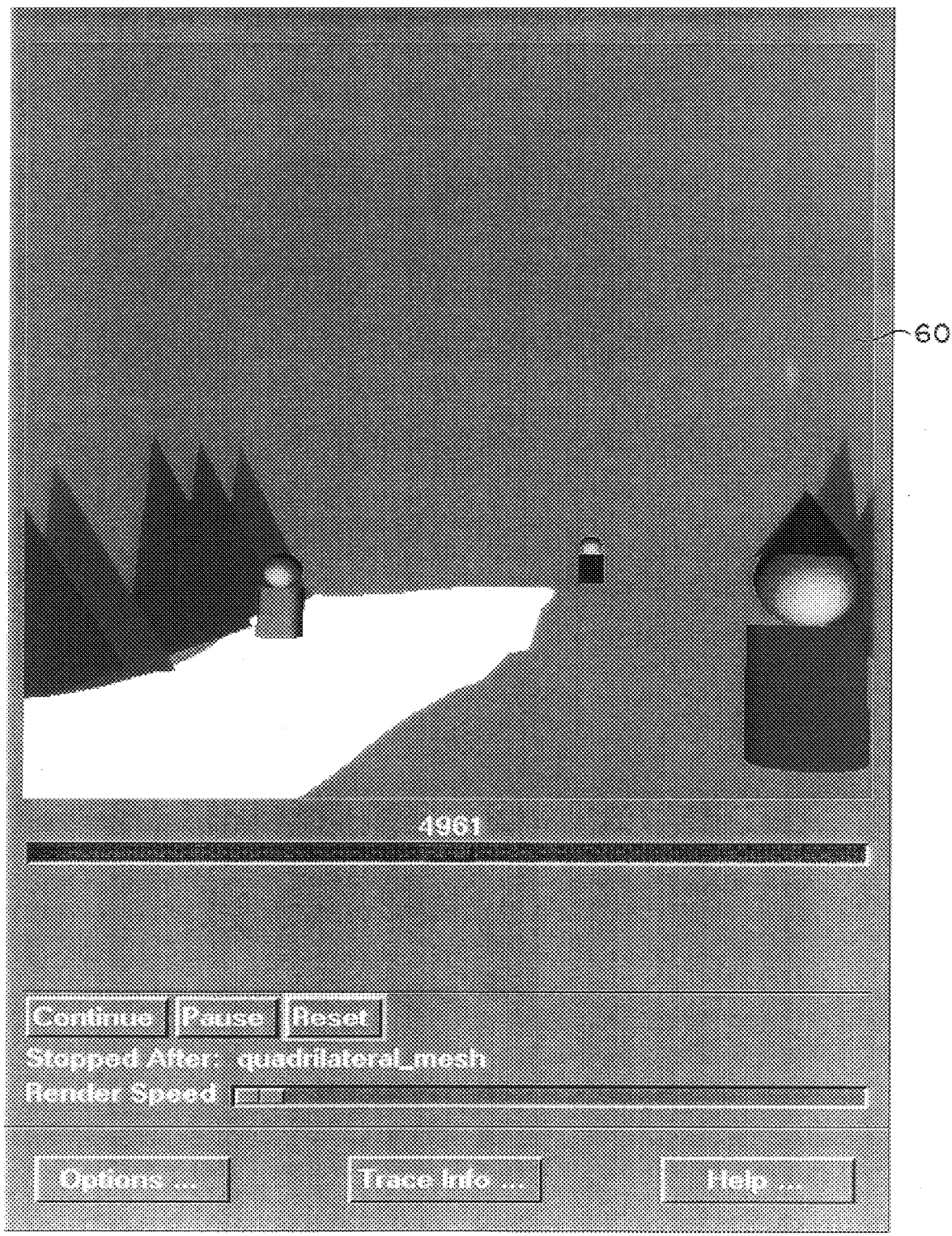

In FIG. 10, only primitives used for the geometry accelerated path through the graphics pipelines are rendered by analyzer tool 25 to generate image 60, as discussed above.

Figure 11:
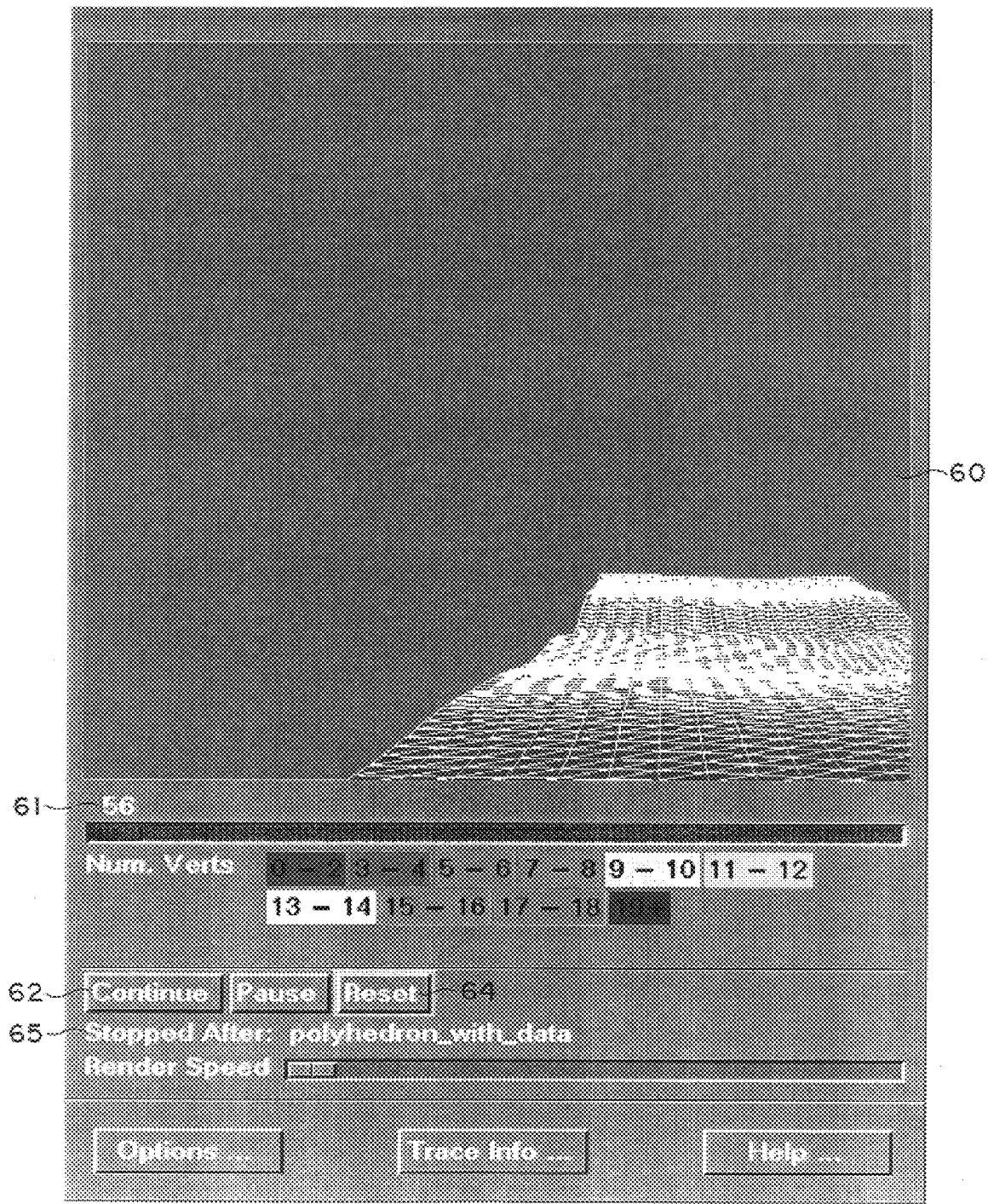

In FIG. 11, a breakpoint (an API call polyhedron_with_data) was set on which to halt execution/rendering of image 60. Display line 65 indicates that analyzer tool 25 reached the API call (polyhedron_with_data) and stopped executing/rendering image 60. Current API call event indicator 61 indicates 56 API events (representing 56 API calls from graphic application 21 to graphics library 22) were used by analyzer tool 25 to generate the portion of image 60 shown in FIG. 11. If reset button 64 is selected by the user, analyzer tool 25 will clear image 60 and point to a first API event in the event stream trace. When the user selects continue button 62, generation/rendering of image 60 will continue until analyzer tool 25 reaches another breakpoint or finishes rendering image 60.

Figure 12:
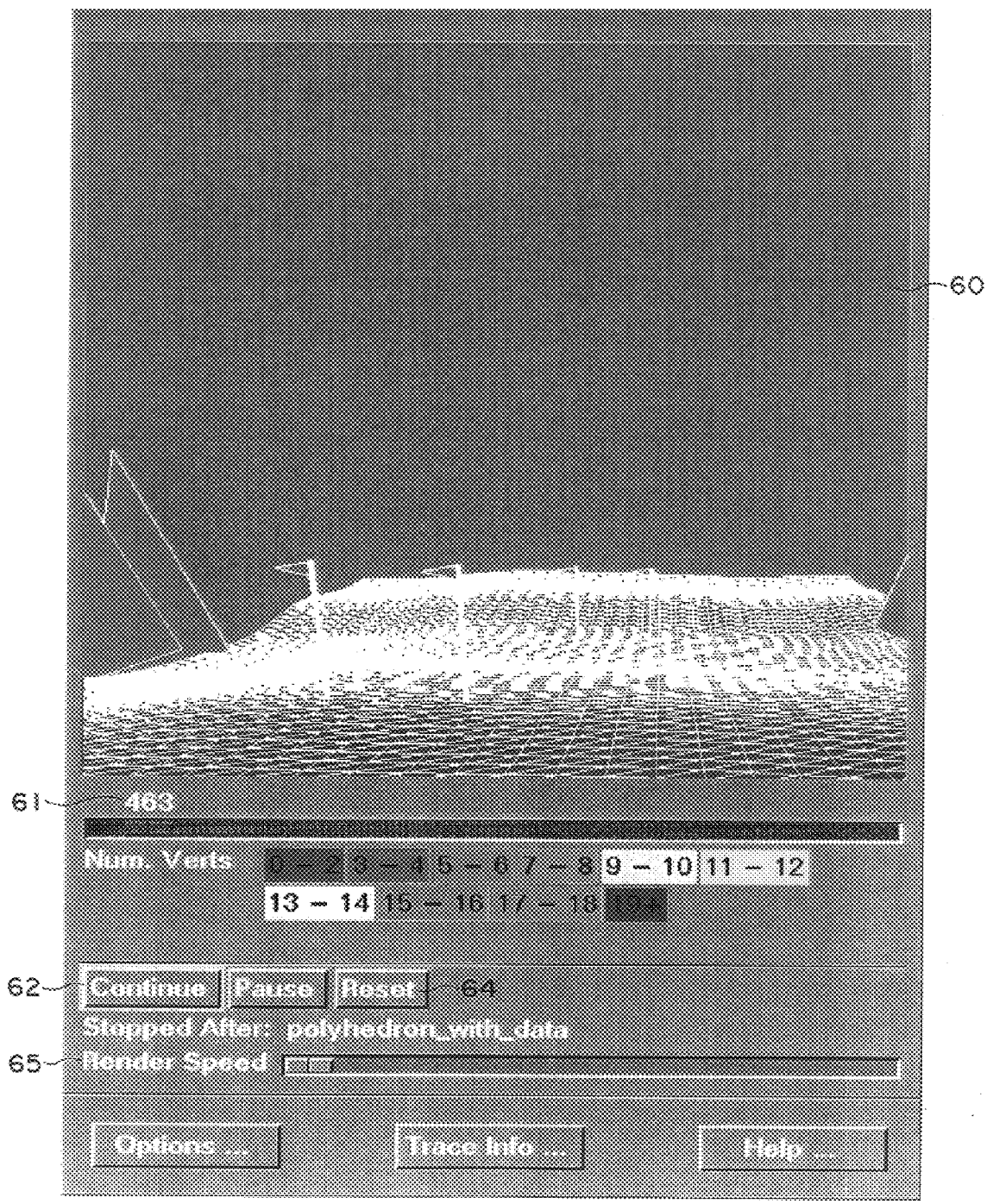

As shown in FIG. 12, the user selected continue button 62 and encountered a breakpoint when analyzer tool 25 again encountered the API call polyhedron_with_data. On encountering the API call polyhedron_with_data, analyzer tool 25 stopped generating/rendering image 60. Current API call event indicator 61 indicates 463 API events were used by analyzer tool 25 to generate the portion of image 60 shown in FIG. 12. If reset button 64 is selected by the user, analyzer tool 25 will clear image 60 and point to the first API event in the event stream trace. When the user selects continue button 62 generation/rendering of image 60 will continue until analyzer tool 25 reaches another breakpoint or finishes rendering image 60.

Figure 13:
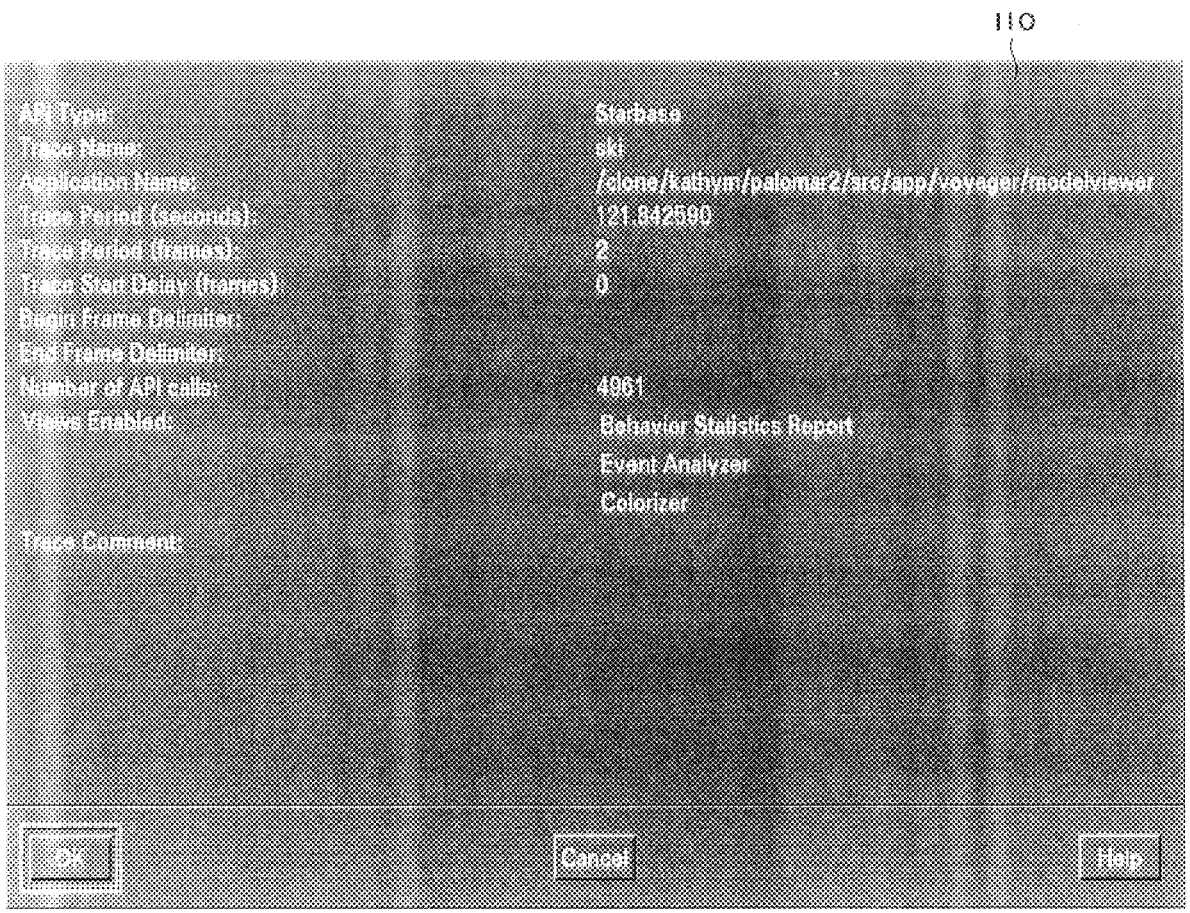

FIG. 13 shows a trace information dialog box 110. Within trace information dialog box 110 there is shown various information including the API type, a trace name, an application name, the trace period, the number of API calls and the views enabled. As can be seen from trace information dialog box 110, more than one view may be enabled at a time.

In various preferred embodiments of the present invention, additional information pertaining to primitives within graphics library 22 used originally to render an image may be encoded through colors selected for the image when the image is re-rendered by analysis tool 25. For example, the color of a portion of an image re-rendered by analysis tool 25 can be selected based on how long it took for a primitive within graphics library 22 to render the portion of the image (i.e., rendering time). This gives a user information about how long various primitives within graphics library 22 are taking to render portions of the image. For example, when the selected color attribute is "rendering time", analyzer tool 25 utilizes logic similar to the pseudo code set out in Table 4 below to color each portion of image 60. The selected amounts of time (0.1 seconds and 0.5 seconds) in the pseudo code set out in Table 4 below is adjustable.

TABLE 4

If time_to_render < 0.1 seconds
    Color the portion green;

TABLE 4-continued

If time_to_render >= 0.1 seconds and time_to_render < 0.5 seconds
    Color the portion yellow;
If time_to_render >= 0.5 seconds
    Color the portion red;

Alternatively, the color of a portion of an image re-rendered by analysis tool 25 can be selected based on how much time elapsed since the last primitive within graphics library 22 was called to render a prior portion of the image (i.e., elapsed time). This gives a user information about how long graphics application 21 is taking to render portions of the image. For example, when the selected color attribute is "elapsed time", analyzer tool 25 utilizes logic similar to the pseudo code set out in Table 5 below to color each portion of image 60. The selected amounts of time (0.1 seconds and 0.5 seconds) in the pseudo code set out in Table 5 below is adjustable.

TABLE 5

If time_elapsed < 0.1 seconds
    Color the portion green;
If time_elapsed >= 0.1 seconds and time_elapsed < 0.5 seconds
    Color the portion yellow;
If time_elapsed >= 0.5 seconds
    Color the portion red;

Alternatively, the color of a portion of an image re-rendered by analysis tool 25 can be selected based on how many pixels were used to render the portion of the image (i.e., number of pixels). For example, when the selected color attribute is "number of pixels", analyzer tool 25 utilizes logic similar to the pseudo code set out in Table 6 below to color each portion of image 60. The pixel values (10 and 20) in the pseudo code set out in Table 6 below is adjustable.

TABLE 6

If number_of_pixels < 10
    Color the portion green;
If number_of_pixel_ >= 10 and number_of_pixels < 20
    Color the portion yellow;
If number_of_pixels >= 20
    Color the portion red;

Alternatively, the color of a portion of an image re-rendered by analysis tool 25 can be selected based on how many facets were used to render the portion of the image (i.e., number of facets). For example, when the selected color attribute is "number of facets", analyzer tool 25 utilizes logic similar to the pseudo code set out in Table 7 below to color each portion of image 60. The facet values (10 and 20) in the pseudo code set out in Table 7 below is adjustable.

TABLE 7

If number_of_facets < 10
    Color the portion green;
If number_of_facets >= 10 and number_of_facets < 20
    Color the portion yellow;
If number_of_facets >= 20
    Color the portion red;

Alternatively, the color of a portion of an image re-rendered by analysis tool 25 can be selected based on whether an attribute was set redundantly before the portion of the image was rendered (i.e., redundant attributes). Within graphics library 22, many different types of attributes may be used for primitives. Attributes can include, for example, fill color, fill style, line color, and so on. When using redundant attributes to re-render portions of an image, colors selected to re-render portion of the image are based on whether or not there were any redundant attribute calls made since the last primitive within graphics library 22 was called to render a prior portion of the image. Attribute calls are considered to be redundant when the values in a current attribute call are the same as the current attribute values. For example, when the selected color attribute is "redundant attributes", analyzer tool 25 utilizes logic similar to the pseudo code set out in Table 8 below to color each portion of image 60.

TABLE 8

```
event = first event in trace
while there are unprocessed events
    set redundant_attribute to false
    while current event is not a primitive event
        if (current event is attribute call AND attributes are same as
                current value
            set redundant_attribute to true;
        get next event
    if redundant_attribute is true
        color the primitive red
    else
        color the primitive green
    get next event
```

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for analyzing an image rendered by a graphics application, the method comprising the steps of:

(a) in a first mode, rendering the image in pre-selected colors; and, (b) in a second mode, rendering the image so that colors used to render the image encode information about the image, the information pertaining to primitives within a graphics library of routines which are used to render the image.

2. A method as in claim 1 wherein in step (b), a first color used to render a first part of the image indicates a number of vertices of the first part of the image.

3. A method as in claim 1 wherein in step (b), a first color used to render a first part of the image indicates which type of primitive is used to render the first part of the image.

4. A method as in claim 1 wherein in step (b), a first color used to render a first part of the image indicates scheduling path within the graphics library used to render the first part of the image.

5. A method as in claim 1 wherein in step (a), the image is a three dimensional image.

6. A method as in claim 1 wherein in step (b), a first color used to render a first part of the image indicates an amount of time for a primitive within the graphics library to render the first part of the image.

7. A method as in claim 1 wherein in step (b), a first color used to render a first part of the image indicates an elapsed of time between the graphics application making primitive calls, the elapsed time beginning when a previously called primitive returns control to the graphics application and the elapsed time ending when the graphics application called a first primitive within the graphics library which renders the first part of the image.

8. A method as in claim 1 wherein in step (b), a first color used to render a first part of the image indicates a number of pixels used to display the first part of the image.

9. A method as in claim 1 wherein in step (b), a first color used to render a first part of the image indicates a number of facets of the first part of the image.

10. A method as in claim 1 wherein in step (b), a first color used to render a first part of the image indicates whether an attribute was set redundantly before the first part of the image was rendered.

11. An analyzer tool, comprising:

storing means for storing a trace which includes primitive calls from a graphics application to a graphics library used to render an image; and re-rendering means for re-rendering the image, the re-rendering means including re-coloring means for re-coloring the image so that colors used to re-render the image encode information about the image, the information being derived from the trace.

12. An analyzer tool as in claim 11 wherein a first color used by the re-rendering means to re-render a first part of the image indicates a number of vertices of the first part of the image.

13. An analyzer tool as in claim 11 wherein a first color used by the re-rendering means to re-render a first part of the image indicates which type of primitive is used to re-render the first part of the image.

14. An analyzer tool as in claim 11 wherein a first color used by the re-rendering means to re-render a first part of the image scheduling path within the graphics library used to re-render the first part of the image.

15. An analyzer tool as in claim 11 wherein the image is a three dimensional image.

16. An analyzer tool as in claim 11 wherein a first color used to render a first part of the image indicates an amount of time for a primitive within the graphics library to render the first part of the image.

17. An analyzer tool as in claim 11 wherein a first color used to render a first part of the image indicates an elapsed of time between the graphics application making primitive calls, the elapsed time beginning when a previously called primitive returns control to the graphics application and the elapsed time ending when the graphics application called a first primitive within the graphics library which renders the first part of the image.

18. An analyzer tool as in claim 11 wherein a first color used to render a first part of the image indicates a number of pixels used to display the first part of the image.

19. An analyzer tool as in claim 11 wherein a first color used to render a first part of the image indicates a number of facets of the first part of the image.

20. An analyzer tool as in claim 11 wherein a first color used to render a first part of the image indicates whether an attribute was set redundantly before the first part of the image was rendered.

21. A method for providing information about how an image is rendered comprising the steps of:

(a) rendering the image in pre-selected colors; and, (b) re-rendering the image so that colors used to re-render the image encode information about how the image was rendered in step (a).

22. A method as in claim 21 wherein in step (b), a first color used to re-render a first part of the image indicates a number of vertices of the first part of the image.

23. A method as in claim 21 wherein in step (b), a first color used to re-render a first part of the image indicates which type of primitive within a graphics library was used to render the first part of the image in step (a).

24. A method as in claim 21 wherein in step (b), a first color used to re-render a first part of the image indicates scheduling path within the graphics library used to render the first part of the image in step (a).

25. A method as in claim 21 wherein in step (a), the image is a three dimensional image.

26. A method as in claim 21 wherein in step (b), a first color used to render a first part of the image indicates an amount of time for a primitive within a graphics library to render the first part of the image.

27. A method as in claim 21 wherein in step (b), a first color used to render a first part of the image indicates an elapsed of time between a graphics application making primitive calls, the elapsed time beginning when a previously called primitive returns control to the graphics application and the elapsed time ending when the graphics application called a first primitive within a graphics library which renders the first part of the image.

28. A method as in claim 21 wherein in step (b), a first color used to render a first part of the image indicates a number of pixels used to display the first part of the image.

29. A method as in claim 21 wherein in step (b), a first color used to render a first part of the image indicates a number of facets of the first part of the image.

30. A method as in claim 21 wherein in step (b), a first color used to render a first part of the image indicates whether an attribute was set redundantly before the first part of the image was rendered.

31. Storage media which stores software which, when executed on a computer system, performs a method for providing information about how an image is rendered, the method comprising the steps of:

(a) rendering the image in pre-selected colors; and, (b) re-rendering the image so that colors used to re-render the image encode information about how the image was rendered in step (a).

32. Storage media as in claim 31 wherein in step (b), a first color used to re-render a first part of the image indicates a number of vertices of the first part of the image.

33. Storage media as in claim 31 wherein in step (b), a first color used to re-render a first part of the image indicates which type of primitive within a graphics library was used to render the first part of the image in step (a).

34. Storage media as in claim 31 wherein in step (b), a first color used to re-render a first part of the image indicates scheduling path within the graphics library used to render the first part of the image in step (a).

35. Storage media as in claim 31 wherein in step (a), the image is a three dimensional image.

36. Storage media as in claim 31 wherein in step (b), a first color used to render a first part of the image indicates an amount of time for a primitive within a graphics library to render the first part of the image.

37. Storage media as in claim 31 wherein in step (b), a first color used to render a first part of the image indicates an elapsed of time between a graphics application making primitive calls, the elapsed time beginning when a previously called primitive returns control to the graphics application and the elapsed time ending when the graphics application called a first primitive within a graphics library which renders the first part of the image.

38. Storage media as in claim 31 wherein in step (b), a first color used to render a first part of the image indicates a number of pixels used to display the first part of the image.

39. Storage media as in claim 31 wherein in step (b), a first color used to render a first part of the image indicates a number of facets of the first part of the image.

40. Storage media as in claim 31 wherein in step (b), a first color used to render a first part of the image indicates whether an attribute was set redundantly before the first part of the image was rendered.

* * * * *

UNITED STATES PATENT AND TRADEMARK OFFICE
CERTIFICATE OF CORRECTION

PATENT NO : 5,903,278
DATED : May 11, 1999
INVENTOR(S) : Mitchell et al.

It is certified that error appears in the above-identified patent and that said Letters Patent is hereby corrected as shown below:

Column 2, (line 48), delete "(s)" before "will".
Column 7, (line 35), after " "5-6"," insert --"7-8",--.
Column 8, (line 63), after "buffers" insert --is--.
Column 8, (line 66), delete "data-path" and insert therefor --data path--.
Column 10, (line 43), delete "number_of_pixel_" and insert therefor --number_of_pixels--.
Column 11, (line 23), after "if" delete "(current" and insert therefor --current--.

IN THE CLAIMS

Column 11, (line 67), delete "elapsed" and insert therefor --elapse--.
Column 12, (line 45), delete "elapsed" and insert therefor --elapse--.
Column 13, (line 20), delete "elapsed" and insert therefor --elapse--.
Column 14, (line 23), delete "elapsed" and insert therefor --elapse--.

Signed and Sealed this

Tenth Day of October, 2000

Attest:

Q. TODD DICKINSON

*Attesting Officer*  *Director of Patents and Trademarks*